United States Patent
Parrott et al.

(10) Patent No.: US 10,900,776 B2
(45) Date of Patent: Jan. 26, 2021

(54) SENSOR DEVICE FOR DISTANCE OFFSET MEASUREMENTS

(71) Applicant: Saudi Arabian Oil Company, Dhahran (SA)

(72) Inventors: Brian Parrott, Thuwal (SA); Sahejad Patel, Thuwal (SA); Fadl Abdellatif, Thuwal (SA); Pablo Carrasco Zanini, Barcelona (ES); Ayman Amer, Thuwal (SA); Ali Outa, New York, NY (US); Abdullah Arab, Thuwal (SA)

(73) Assignee: Saudi Arabian Oil Company, Dhahran (SA)

( * ) Notice: Subject to any disclaimer, the term of this patent is extended or adjusted under 35 U.S.C. 154(b) by 34 days.

(21) Appl. No.: 16/100,458

(22) Filed: Aug. 10, 2018

(65) Prior Publication Data

US 2019/0242701 A1 Aug. 8, 2019

Related U.S. Application Data

(60) Provisional application No. 62/626,954, filed on Feb. 6, 2018.

(51) Int. Cl.
*G01B 11/27* (2006.01)
*G01B 5/02* (2006.01)
(Continued)

(52) U.S. Cl.
CPC .......... *G01B 11/272* (2013.01); *G01B 5/0021* (2013.01); *G01B 5/025* (2013.01);
(Continued)

(58) Field of Classification Search
CPC .... G01B 11/272; G01B 5/0021; G01B 5/025; G01B 11/14; G01C 15/006; G01F 17/00
See application file for complete search history.

(56) References Cited

U.S. PATENT DOCUMENTS 3,894,230 A 8/1975 Rorden et al.
3,999,423 A 12/1976 Tyree
(Continued)

FOREIGN PATENT DOCUMENTS

EP 2650658 A1 10/2013
WO WO-2019215192 A1 * 11/2019 ........... G06K 9/0004

OTHER PUBLICATIONS

Michiue, Norimasa, Mitsuru Baba, and Kozo Ohtani. "A new sensor system for simultaneously detecting the position and incident angle of a light spot." SICE 2003 Annual Conference (IEEE Cat. No. 0311-18734). vol. 1. IEEE, 2003.
(Continued)

*Primary Examiner* — Rebecca C Bryant
(74) *Attorney, Agent, or Firm* — Leason Ellis LLP

(57) ABSTRACT

A sensing device for measuring an offset along a longitudinal axis comprises a housing including a plurality of slots, two or more arrays of optical sensors aligned along the longitudinal axis, at least one of the arrays being offset along the longitudinal axis with respect to the other arrays and a microcontroller coupled to the two or more arrays of optical sensors and configured to determine a positional offset along the longitudinal axis at which light is detected by at least one of arrays of optical sensors. In some embodiments, each of the optical sensors of the arrays are positioned within the housing underneath one of the plurality of slots to reduce an angle of incidence of radiation received.

16 Claims, 7 Drawing Sheets

(51) Int. Cl.
*G01B 11/14* (2006.01)
*G01C 15/00* (2006.01)
*G01F 17/00* (2006.01)
*G01B 5/00* (2006.01)
*G01B 11/24* (2006.01)

(52) U.S. Cl.
CPC .............. *G01B 11/14* (2013.01); *G01B 11/24* (2013.01); *G01C 15/006* (2013.01); *G01F 17/00* (2013.01)

(56) References Cited

U.S. PATENT DOCUMENTS

| | | | |
|---|---|---|---|
| 4,820,041 A | 4/1989 | Davidson et al. | |
| 6,222,181 B1 | 4/2001 | Ichigaya | |
| 8,596,217 B2 | 12/2013 | Kipfer et al. | |
| 8,989,897 B2 | 3/2015 | de Smet | |
| 10,771,668 B2* | 9/2020 | Wippermann | G02B 13/0015 |
| 2001/0023766 A1 | 9/2001 | Ohtomo et al. | |
| 2006/0238631 A1 | 10/2006 | Ligozat et al. | |
| 2009/0040506 A1* | 2/2009 | Naor | G01N 21/474 |
| | | | 356/73 |
| 2010/0277431 A1* | 11/2010 | Klinghult | G06F 3/0412 |
| | | | 345/174 |
| 2013/0155396 A1* | 6/2013 | Deliwala | G01J 1/0242 |
| | | | 356/138 |
| 2014/0204399 A1 | 7/2014 | Dumoulin | |
| 2014/0345375 A1 | 11/2014 | Hassell, Jr. | |
| 2019/0011567 A1* | 1/2019 | Pacala | G01S 17/89 |

OTHER PUBLICATIONS

International Search Report and Written Opinion in corresponding PCT Application No. PCT/US2019/016800, dated Aug. 23, 2019. 20 pages.

International Preliminary Report on Patentability in corresponding PCT Application No. PCT/US2019/016800, dated Feb. 7, 2020. 14 pages.

* cited by examiner

SENSOR DEVICE FOR DISTANCE OFFSET MEASUREMENTS

CROSS-REFERENCE TO RELATED APPLICATIONS

The present invention claims priority to U.S. Provisional Patent Application Ser. No. 62/626,954, filed Feb. 6, 2018, which is incorporated by reference herein in its entirety.

FIELD OF THE INVENTION

The present invention relates to measurement of structural changes to objects including deformation, and in particular relates to a device for measuring offsets for calibration of storage tanks.

BACKGROUND OF THE INVENTION

In the oil and gas industry storage tanks are calibrated periodically in order to be able to accurately determine their fuel capacity. This is an important task as some storage tanks are extremely large and can store 2,000,000 barrels or more. A relative small percentage volume error for such tanks can translate into a considerable error in terms of oil barrel volume.

The conventional method of determining tank volume is filling the tank with fluid and then, after reaching capacity, metering the fluid as it is drained. This method is both time consuming and costly, and tanks cannot be in use while the capacity measurements are made. Recently, measurement techniques based on optical sensing have been applied that overcome the limitations of the conventional fill-and-drain method. Commonly-owned and assigned U.S. Pat. No. 9,188,472 ('472 patent), incorporated by reference herein in its entirety, describes an optical measurement system and method particularly adapted for fuel tank calibration. However, this previous patent does not disclose details concerning a sensor configuration that efficiently accomplishes this task, relying instead on those skilled in the art to develop such a sensor. This disclosure represents a significant improvement upon the concept of the simplest sensor system that would be required for the previous system. FIG. 1 is a schematic side view of tank calibration system according to the '472 patent. The system 100 includes a storage tank, a robotic device 104, such as a trolley or drone, remotely controllable to move up, down and around the circumference of the storage tank, a laser reference device 106 positioned at a known distance from the center of the storage tank, and an optical sensor 108 coupled to the robotic device. A reference point on the storage tank has a "reference circumference" with respect to which deviations of the surface of the storage tank are determined.

In operation, the laser reference device 106 emits a vertical reference laser line 110 (the beam has a linear width in the horizontal direction), rather oriented parallel to the wall of the tank. As the robotic device 104 moves up and down the circumference of the tank, light from the laser reference device 106 is continually detected by the optical sensor 108 coupled to the robotic device. Any protuberances, recesses and unevenness on the surface of the tank will offset the position at which the optical sensor 108 captures and detects the laser radiation emitted by the laser reference device 106. The measured offset can be used to calculate the magnitude of the deformations of the surface from the reference circumference.

Since the calculation depends on an accurate reading of the position at which the optical sensor 108 detects the laser, this method is reliant, to an appreciable extent, on the design of the optical sensor. While tank calibration techniques have made rapid advances, the optical sensors have not yet been optimized for this procedure.

There is therefore a need for an optical sensor specifically adapted to accurately measure offsets with respect to a longitudinal axis (e.g., vertical line).

It is with respect to these and other considerations that the disclosure made herein is presented.

SUMMARY OF THE INVENTION

Embodiments of the present invention provide a sensing device for measuring an offset along a longitudinal axis. The sensing device comprises a housing including a front surface having a plurality of slots, two or more arrays of optical sensors linearly aligned along the longitudinal axis, at least one of the arrays being offset along the longitudinal axis with respect to the other arrays, and a microcontroller coupled to the two or more arrays of optical sensors and configured to determine a positional offset along the longitudinal axis at which light is detected by at least one of the two or more arrays of optical sensors. In some embodiments, each one of the optical sensors of the two or more arrays are positioned within the housing underneath one of the plurality of slots, so as to reduce an angle of incidence of radiation received by the optical sensors of the two or more arrays.

In certain embodiments, at least some of the plurality of slots are slanted toward the center to further reducing the angle of incidence of radiation received by the optical sensors. It is preferable that the two or more arrays of optical sensors together cover all positions along a span of distance along the longitudinal axis.

In certain embodiments, the sensing device further comprises at least one filter element positioned within the housing and at least partially covering the optical sensors of the two or more arrays so as to block wavelengths other than the wavelength of the laser reference beam from reaching the optical sensors.

In certain implementations, the sensing device includes an additional array of optical sensors arranged linearly with respect to a traverse axis perpendicular to the longitudinal axis, wherein the microcontroller is coupled to the additional array of optical sensors and is configured to determine a positional offset along the transverse axis at which light is detected by the additional array of optical sensors.

At least one of the two or more arrays can be positioned at different depths beneath the plurality of the slots than the others of the two or more arrays. The two or more arrays of optical sensors can include photodiodes sensitive to a wavelength of laser reference beam. In some embodiments, the sensing device further comprises an accelerometer adapted to measure a tilt of the device with respect to a gravity vector. In certain implementations, at least one of the first, second and third arrays includes a single, continuous optical sensor.

In one embodiment, the two or more sensors include first, second and third optical arrays, where the second optical array is linearly offset with respect to the first and third optical arrays.

Further embodiments of the present invention provide a sensing device for measuring an offset along a longitudinal axis. The sensing device comprises a housing having a front surface, two or more arrays of optical sensors arranged linearly aligned along the longitudinal axis within the housing, at least one or the two or more arrays being offset along the longitudinal axis with respect to the other arrays, and a microcontroller coupled to the two or more arrays of optical sensors and configured to determine a positional offset along the longitudinal axis at which light is detected by at least one of the two or more arrays of optical sensors.

In certain embodiments, each one of the optical sensors of the two or more arrays are positioned within the housing underneath one of the plurality of slots, so as to reduce an angle of incidence of radiation received by the optical sensors of the two or more arrays. At least some of the plurality of slots can be slanted toward the center to further reducing the angle of incidence of radiation received by the optical sensors. It is preferable that the two or more arrays together cover all positions along a span of distance along the longitudinal axis.

Some embodiments of the sensing device of the present invention includes an additional array of optical sensors arranged linearly with respect to a traverse axis perpendicular to the longitudinal axis. The microcontroller can be coupled to the additional array of optical sensors and is configured to determine a positional offset along the transverse axis at which light is detected by the additional array of optical sensors.

In some implementations, at least one of the two or more arrays is positioned at different depths beneath the plurality of the slots than the others of the arrays. The two or more arrays of optical sensors can include photodiodes sensitive to a wavelength of laser reference beam. To aid in determining orientation, the sensing device can further comprise an accelerometer adapted to measure a tilt of the device with respect to a gravity vector. In further implementations, at least one of the two or more arrays includes a single, continuous optical sensor.

In some embodiment, the two or more sensors include first, second and third optical arrays linearly arranged along the longitudinal axis, where the second optical array is linearly offset with respect to the first and third optical arrays These and other aspects, features, and advantages can be appreciated from the following description of certain embodiments of the invention and the accompanying drawing figures and claims.

DETAILED DESCRIPTION OF CERTAIN EMBODIMENTS OF THE INVENTION

Embodiments of the present invention provide a sensing device that includes linear arrays of optical sensors which are adjacent to one another and offset with respect to each other along a longitudinal axis. In certain embodiments, the optical sensors comprise multiple linear photodiode arrays or similar high resolution optical sensors. Due to the offset between adjacent linear arrays, any gaps that occur within the linear arrays, individually, are positioned at different levels along the longitudinal axis. Accordingly, there is an optical sensor positioned to capture light at all longitudinal positions within the span of the sensing device (i.e., all gaps are covered). The sensing device can be positioned relative to a surface by a fixed distance and travel along that surface to provide a proxy measurement for the offset of the surface with respect to other measurements and/or the mechanical offset of the laser and sensing device.

Figures 2, 3:
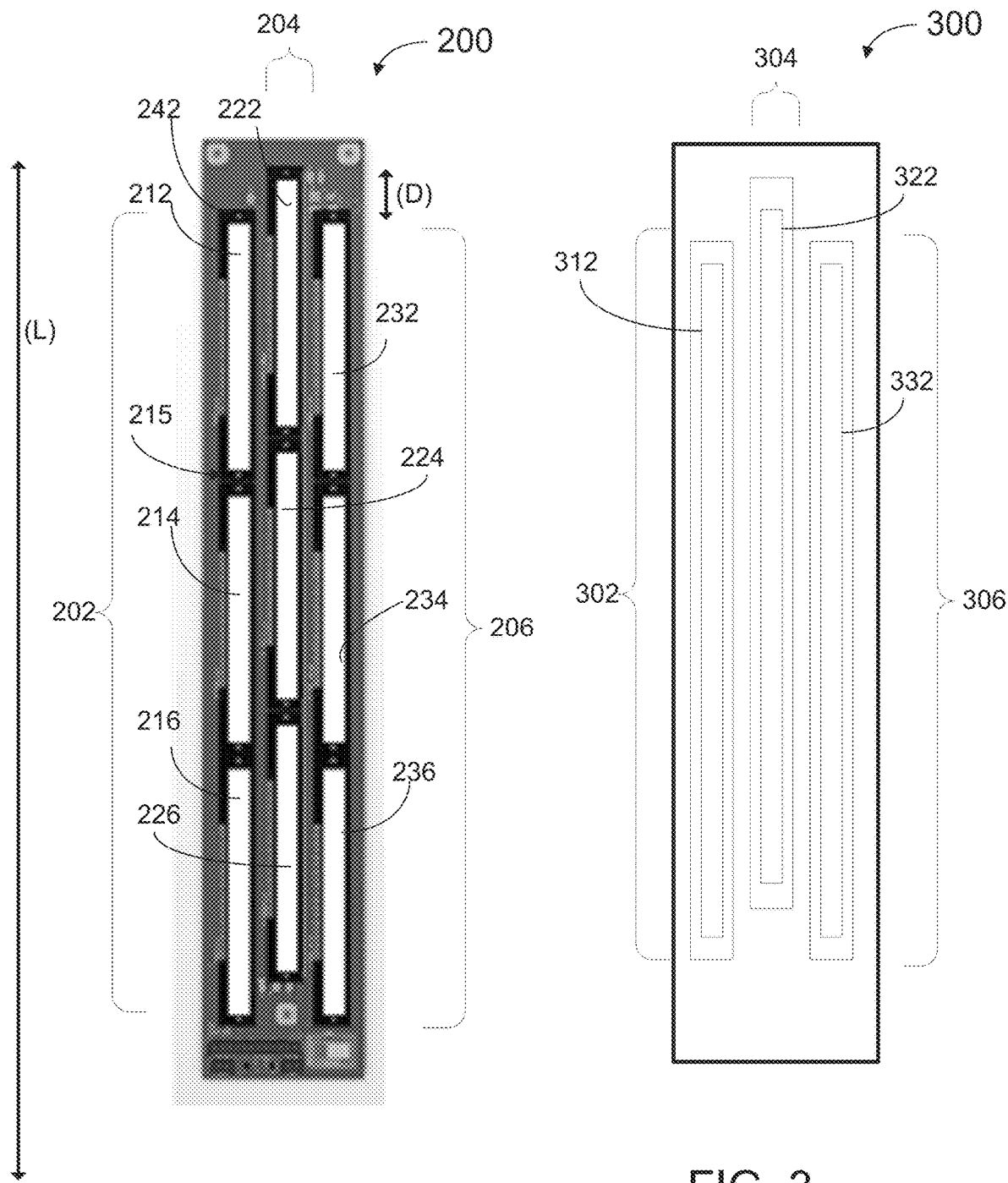
FIG. 2 is a plan view of an embodiment of a sensing device for measuring an offset along a longitudinal axis according to an embodiment of the present invention.
FIG. 3 is a plan view of another embodiment of a sensing device according to an embodiment of the present invention.

FIG. 2 is a plan view of a sensing device for measuring an offset along a longitudinal axis (L) according to an embodiment of the present invention. Sensing device 200 comprises a generally rectangular housing 201 in which linear arrays of optical sensors 202, 204, 206 are embedded. While three linear arrays are shown, the number of linear arrays that can be included in the sensing device is not limited to this number and can generally include two or more linear arrays. Linear array 202 is positioned toward a left edge of the housing, linear array 204 is positioned adjacent to linear array 204 on the right, and linear array 206 is positioned adjacent to linear array 204 on the right, toward the right edge of the housing. In the embodiments depicted each of the linear array 202, 204, 206 include three separate optical sensor elements arranged in series along a longitudinal axis. As such, the linear arrays are arranged parallel to one another. Linear array 202 includes optical sensor element 212 starting a first longitudinal position toward a first end of the device, optical sensor element 214 separated from optical sensor element by a gap distance 215 along the longitudinal axis, and another optical sensor element 216 positioned toward the opposite end of the sensing device, separated by a gap from sensor element 214. FIG. 3 shows an alternative embodiment of a sensing device 300 according to the present invention. This embodiment also includes three linear arrays of optical elements 302, 304, 306. However, each linear array 302, 304, 306 includes a single, continuous optical element 312, 322, 332, respectively, rather than separate elements, such as the three separate elements shown in FIG. 2. While smaller optical elements are more readily available and less expensive, longer, continuous optical element do not have gaps, which is a factor that can be taken into consideration for certain embodiments, as described directly below.

Figure 1:
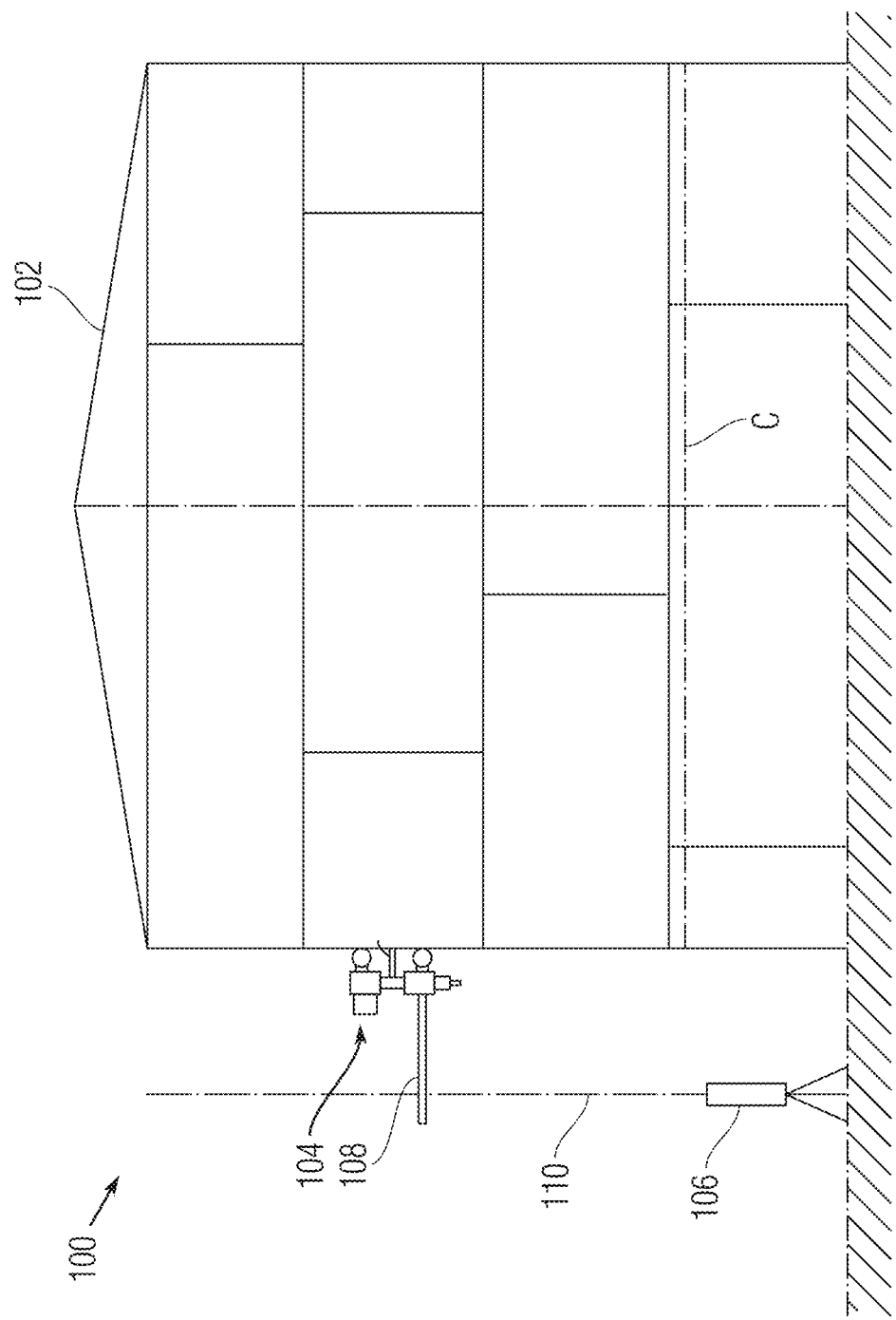
FIG. 1 is a schematic side view of a tank calibration system as disclosed in the prior art.

Linear array 204 also includes three optical sensor elements 222, 224, 226. However, the longitudinal positions of sensor elements 222, 224, 226 are offset longitudinally with respect to sensor elements 212, 214 and 216 of linear array 202. More specifically, optical sensor element 222 is positioned an offset distance (D) toward the edge of the housing (higher, as depicted) with respect to sensor element 212, sensor element 224 is positioned the same offset distance (D) higher than sensor element 214, and sensor element 226 is positioned the same offset distance higher than sensor element 216. It can be discerned in FIG. 1 that the longitudinal span of the gap 215 between sensor elements 212 and 214 of linear array 202 is covered by optical sensor 224 of linear array 204. By offsetting the arrays in the manner shown, gaps between optical sensor elements can be covered by other sensor elements of the device. It is noted that when continuous sensors are used (without gaps), it is possible to use a single linear array, or two perpendicular linear arrays. However, reliance on single arrays (in one or both axial directions) reduces the amount of data available (e.g., tilt and rotation data).

Linear array 206 includes optical sensor elements 232, 234, 236 that are positioned longitudinally in the same positions are sensor elements 212, 214, 216. In this configuration, linear array 206 is also offset with respect to linear array 204, and therefore all adjacent linear arrays are offset longitudinally with respect to each other. Any or all of the optical sensor elements can be implemented using high resolution photodiodes as known in the art. The optical sensors are preferably selected to be sensitive to the wavelength of the laser used in the calibration system to respond to that wavelength preferentially. The multiple linear arrays provide redundancy and also provide rotational information as rotation of the sensing device around the tank (via the robotic device) is detectable due to the transverse offset between the arrays, which would lead to difference readings.

Figure 7:
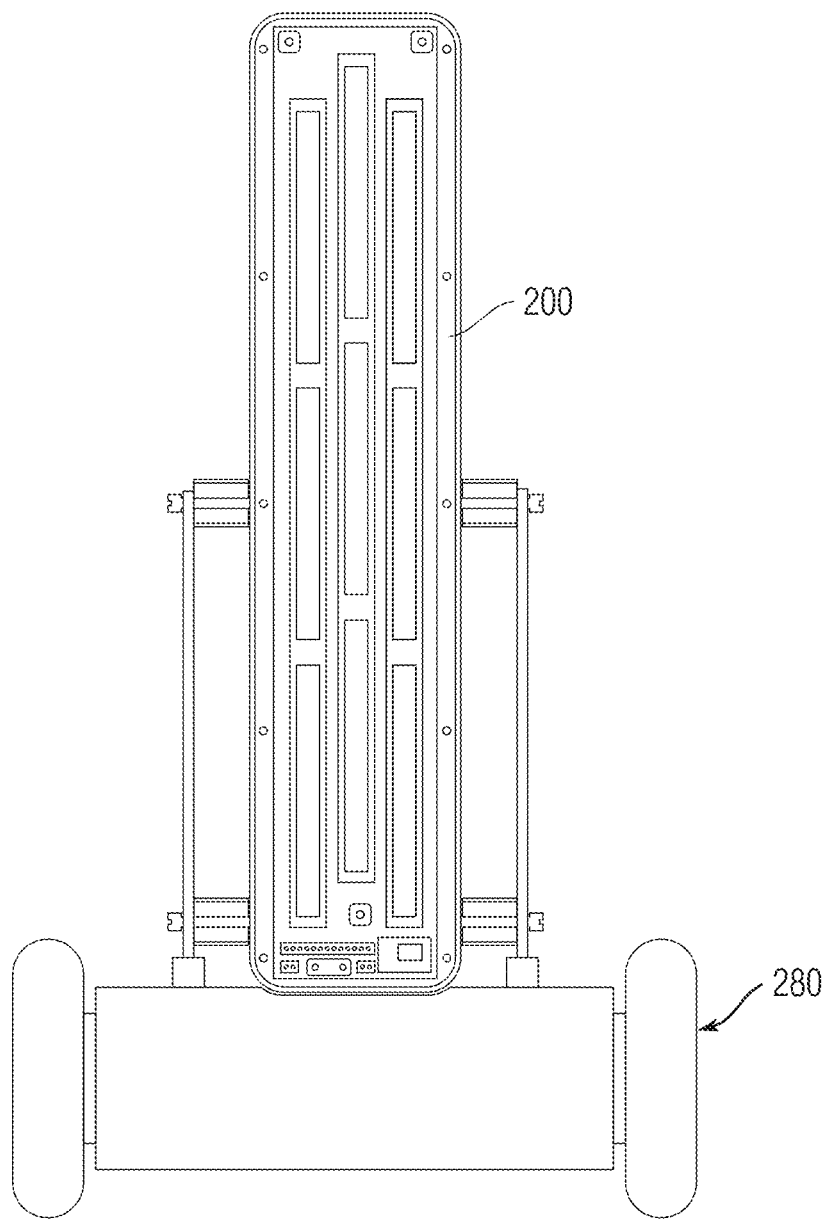
FIG. 7 is an engineering view showing an embodiment of a sensing device according to the present invention, shown coupled to a robot device for navigating around a structure.

Turning briefly to FIG. 7, one way in which a sensing device 200 according to the embodiment shown in FIG. 2 can be mounted is illustrated as being mounted on a robotic vehicle 280 which can be used to conduct offset measurements for structural (e.g., tank) calibration. As the robotic vehicle rolls over the surface of a structure, the optical sensor elements of the sensing device detect the laser reference line at specific pixels, which can then be translated to an offset from the reference circumference of the structure. If multiple pixels are illuminated, an averaging algorithm can be used to determine the center of the beam. This can include corrections for gaps in the illumination. The readings could also be mapped to specific offsets by calibration.

One or more of the optical sensor elements can be positioned in wells that minimize the angle of incidence of incoming radiation. In other words, the housing surface of the sensing device can contain openings (slots) and the optical sensor elements can be positioned beneath the surface of the device under the slots. By setting the sensor elements beneath the surface of the device, the angle of incidence is minimized, ensuring that the substantial majority of radiation detected is incident normal to the surface of the sensing device and comes from the laser reference device. In certain embodiments, to reduce the possibility of detecting stray radiation further, the slots can be slanted toward the center to remain narrower while still allowing the laser radiation to be detected. This slanting can take into account the various angle of incidence of the laser as it impinges upon the sensor elements. For example, the slanting can be asymmetric on either side of a slot to efficiently minimize slot size and incident angles while still ensuring that the laser can reach the sensor elements at every location.

Figure 4:
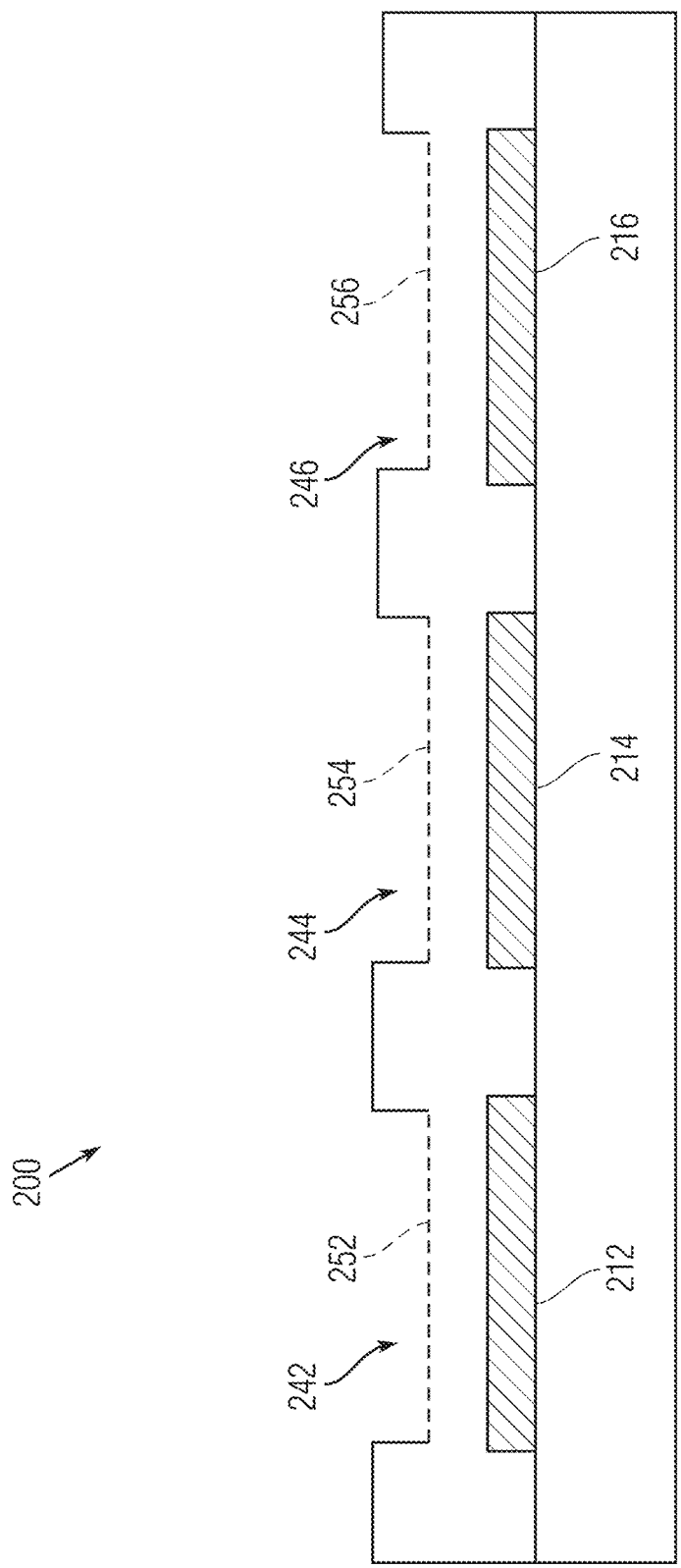
FIG. 4 is a longitudinal cross-sectional view of an embodiment of a sensing device according to the present invention.

FIG. 4 is a cross-sectional view of sensing device 200, showing linear array 202 including optical sensor elements 212, 214, 216 installed within or otherwise in register with respective slots 242, 244, 246 under the surface of the housing. Respective filter elements 252, 254, 256 are positioned above sensor elements 212, 214, 216 so as to provide respective filters to wavelengths that otherwise would impinge on the respective sensor elements. The filter elements 252, 254, 256 can be single-purpose filters such as band-gap filters that pass only a narrow band of wavelengths matching the laser, or polarizing filters that reduce detection of reflected and scattered light. More preferably, the filter elements can combine functionality with multiple components. The optical sensor elements are preferably also selected to be particularly sensitive to the wavelength of the laser. In certain embodiments, the optical sensor element output analog measurements for each pixel reading in order to accurately find the centroid of where the light is hitting the arrays. In other embodiments, the sensor elements can output digital (on/off) signals for each pixel, which still enables determination of the centroid, but with less accuracy. Additionally, the centroid readings or the readings of each pixel can be digitally communicated.

Figure 5:
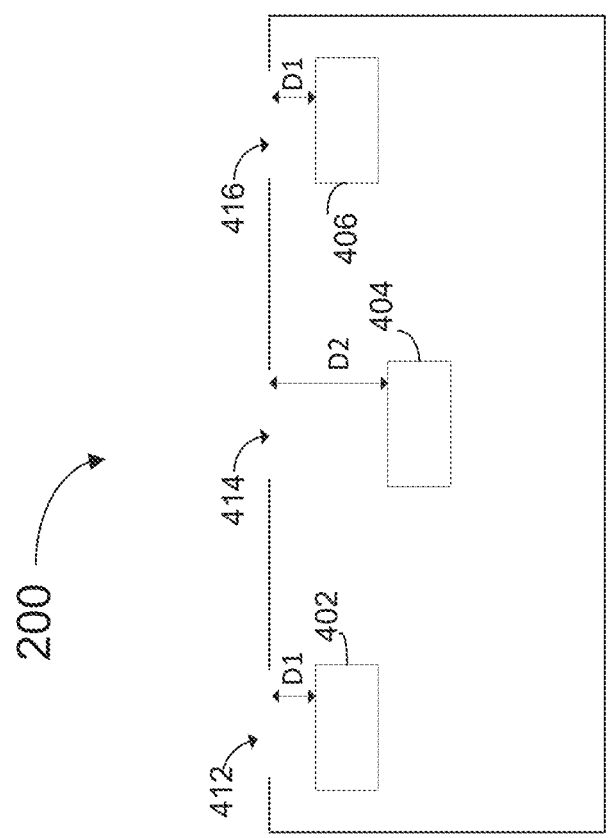
FIG. 5 is a longitudinal cross-sectional view of another embodiment of a sensing device according to the present invention.

In another embodiment of a sensing device 400 shown in FIG. 5, the depths of the linear arrays of optical elements are non-uniform. In this end cross-sectional view, it can be seen that linear array 402 is positioned at a depth D1 beneath slot 412, linear array 404 is positioned at a depth D2, greater than D1, below slot 414, and linear array 406 is positioned at depth D1 beneath slot 416. The difference in height between the linear arrays can be established using conventional mechanical spacers or other fixtures as known in the art. The non-uniform depths of the linear arrays can provide information on potential misalignment between the sensing device and the laser reference device.

Figure 6:
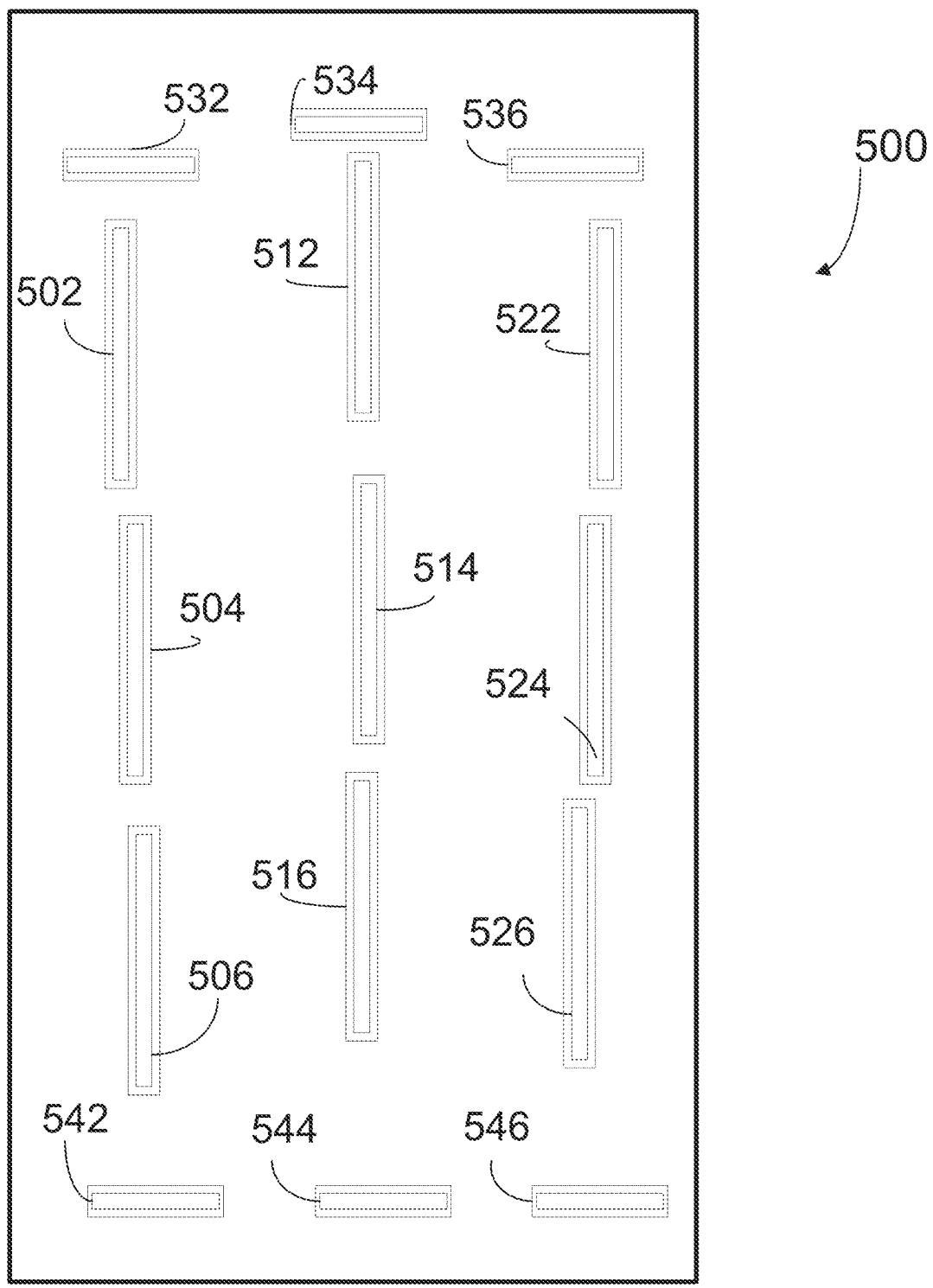
FIG. 6 is a plan view of an embodiment of a sensing device for measuring an offset along both a longitudinal axis and a transverse axis according to an embodiment of the present invention.

Other embodiments of the sensing device according to the present invention include both vertical and horizontal arrays of optical sensing elements. In FIG. 6, which is a plan view of a such an embodiment, sensing device 500 includes three vertical arrays adapted to detect an offset with respect to a longitudinal axis: a first vertical array including optical sensor elements 502, 504 and 506, a second (middle) vertical array including optical sensor elements 512, 514 and 516, and a third vertical array including optical sensor elements 522, 524 and 526. As shown, the middle vertical array including sensor elements 512, 514 and 516 is offset with respect to the other vertical arrays. However, the vertical arrays are arranged so that adjacent arrays cover any gaps (i.e., there are no gaps in the sensing device as a whole). In addition, there are horizontal arrays adapted to detect offsets with respect to a transverse axis. A first horizontal array includes optical sensor elements 532, 534 and 536, and a second horizontal array includes optical sensor elements 542, 544 and 546. The horizontal arrays enable detection of a horizontal offset in addition to a vertical offset. In an alternative embodiment, two-dimensional arrays of optical sensing elements can be used instead of distinct and separate vertical and horizontal sensor elements.

The laser reference device 106 (FIG. 1) can be adapted to take advantage of embodiments of the sensing device that include both vertical and horizontal linear arrays of optical sensor elements. For instance, rather than a casting a linear-shaped beam, the laser reference device can cast a beam in the shape of a cross (via a suitable aperture), or alternatively, two laser beams can be emitted together to form a T or cross. In certain implementations, in which the arrays of sensor elements are closely spaced, the laser can direct a beam with a large diameter that can be detected by all or a number of arrays simultaneously allowing for an accurate centroid to be determined. The beam in this case can have a radial pattern of variable intensity to aid in determining the center more accurately.

Figure 8:
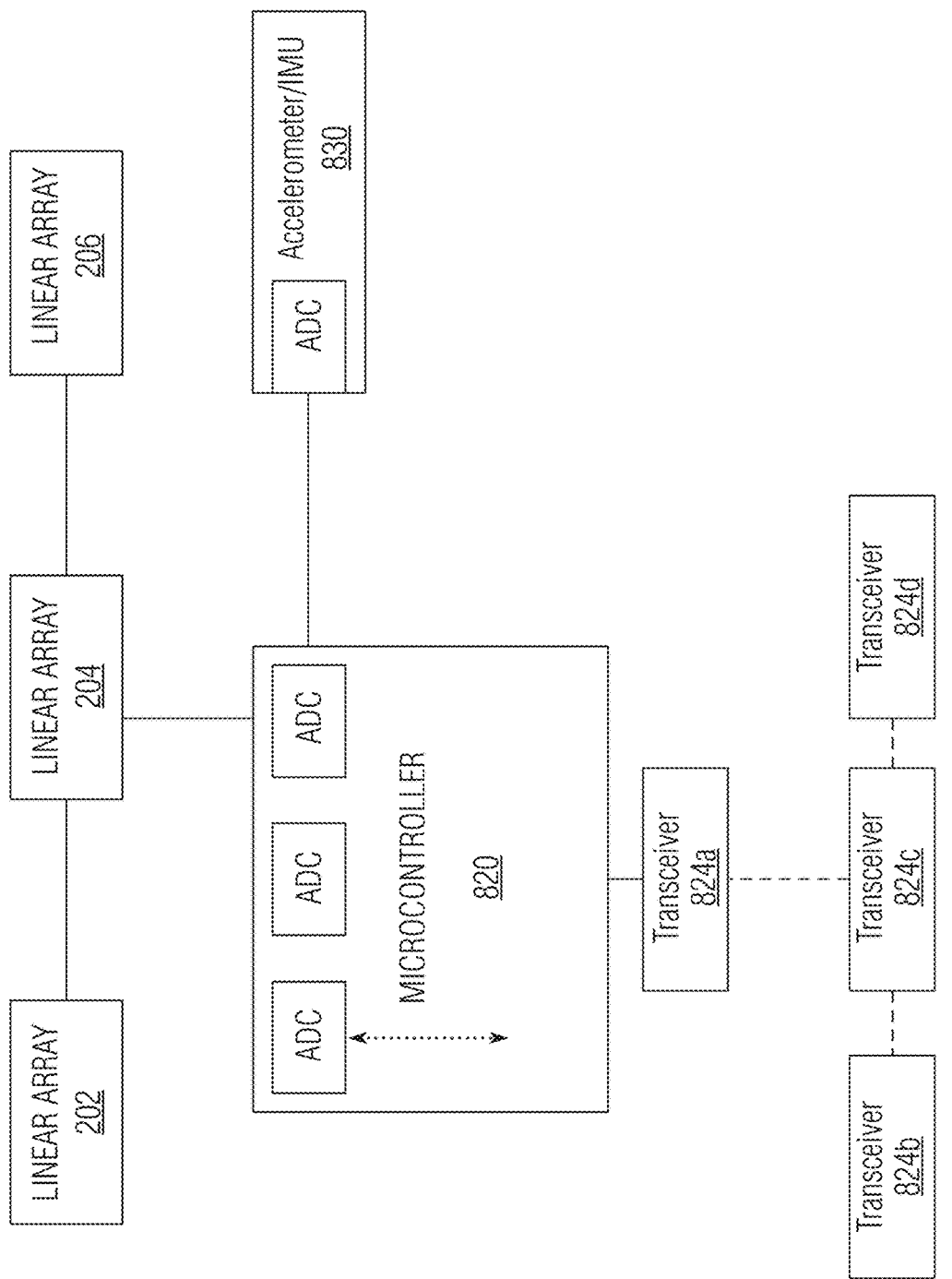
FIG. 8 is a schematic block diagram of a system for measuring an offset along a longitudinal axis according to an embodiment of the present invention.

FIG. 8 is a schematic diagram of a system for measuring an offset according to the present invention. Linear arrays of sensors (e.g., 202, 204, 206) detect optical input and output analog detection signals. The analog signals can be converted to digital signals by ADC conversion components co-located with the sensors in a sensor module or can be communicated directly via a wire connection in analog form to a microcontroller 820. Microcontroller 820 can drive the readings of the linear arrays of sensors 202, 204, 206. The microcontroller 820 can be implemented using one or more processors, such as microprocessors or digital signal processors. In some embodiments, the microcontroller 820 can include one or more ADC components for converting analog signals received over one or more communication ports into digital signals for further processing. 810 can also be part of the microcontroller component. In the embodiment depicted, the microcontroller 820 is co-located with the linear arrays 202, 204, 206 and ADC 810 within the sensing device. However, in other embodiments, the ADC 810 is communicatively coupled to the microcontroller 820 by a wired or wireless connection based on known protocols. The microcontroller 820 is communicatively coupled to a plurality of transceivers 824a, 824b, 824c, 824d via which the microcontroller can transmit the sensor data to other microcontrollers that control the robotic vehicle and communicate with end users. In certain embodiments, the sensing device includes an accelerometer or inertial measurement unit 830 that provides additional orientation data regarding the sensing device to the microcontroller 820.

In operation, the microcontroller 820 receives the light detection data from the linear arrays and determines from this data, using code executing therein, the position that the laser beam emitted by the laser reference device is striking the sensing device. As the position of the laser reference device is known, an offset to the position of the sensing device can be derived from this information. In preferred implementations, the microcontroller utilizes multiple measurements to fix the position of the laser beam. This procedure provides highly accurate relative measurements between two positions of the sensing device. Data received from the accelerometer can be used by the microcontroller 820 to correct for movements or tilts with respect to the normal direction of the surface traversed by the sensing device via the robotic vehicle, again, but using code executing in the processor(s) of the microcontroller 820. Similarly, readings across multiple linear arrays can be compared by the microcontroller 820 to determine tilt or horizontal drift around a curved surface, such as a tank wall, allowing for corrections in position or in the data itself. Data fusion between the linear arrays and the accelerometer can be used to better estimate the position and orientation of the sensor elements. In some embodiments, readings can be based on digital readings (pulsed process) rather than absolute analog readings.

Using a calibrated device at a known distance, the alignment of the sensing device with respect to a base station can be verified by measuring the width of the laser beam as it hits the sensing device. If it is larger than it ought to be, it means that there is an angular misalignment between the plane normal to the surface of the sensing device and the direction the light is being emitted. This could arise from errors in the base station alignment or via the sensing device surface being angled with respect to the ground (i.e., normal to the gravity vector). The orientation of the robotic vehicle on which the sensing device is placed can be stabilized to ensure that the thinnest line can be maintained via rotation of the sensing device with respect to the structure surface thereby overcoming potential misalignment due to the sensing device. In other embodiments, the sensing device can be positioned on a rotating arm or shaft on the robotic device, so that the orientations of the sensors with respect to the robotic device can be changed by actuation. In this way, the sensing device can be rotated with two degrees of freedom (roll, pitch) with respect to the vertical defined by the gravity vector. As noted, alignment correction can be aided by the on-board accelerometer 830. Alternatively, if the error is coming from misalignment of the base station, the base station can utilize this information in attempting to align itself, possibly using multiple sensors select the alignment setting that minimizes the error proportional to the accuracy and reliability of the available inputs. The information can be communication between the sensing device and the base station by respective on-board transceivers.

In further embodiments, two or more parallel laser beams are emitted from one or multiple laser reference devices. In such embodiments, offset measurements can be obtained using the microcontroller 820 with less concern for gaps in the sensor assembly. The alignment of the two or more reference devices with respect to a base station can be verified by ensuring that the spread between each of lasers remains constant. Additionally, the distance between parallel laser lines can be used to determine the tilt of the sensor assembly, potentially in coordination with accelerometer data. Additionally, the robotic vehicle carrying the sensing device can have distance measuring sensors (e.g., lidar, ultrasonic, etc.) that measure the distance between the base station and the sensing device or the distance to the ground or other reference.

It is to be understood that any structural and functional details disclosed herein are not to be interpreted as limiting the systems and methods, but rather are provided as a representative embodiment and/or arrangement for teaching one skilled in the art one or more ways to implement the methods.

It is to be further understood that like numerals in the drawings represent like elements through the several figures, and that not all components and/or steps described and illustrated with reference to the figures are required for all embodiments or arrangements The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing, and are not to be construed as limiting. However, it is recognized these terms could be used with reference to a viewer. Accordingly, no limitations are implied or to be inferred.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

While the invention has been described with reference to exemplary embodiments, it will be understood by those skilled in the art that various changes can be made and equivalents can be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A sensing device for measuring an offset along a longitudinal axis comprising:
    a housing including a front surface having a plurality of slots;
    two or more arrays, each array including a plurality of optical sensors which are linearly aligned along the longitudinal axis, at least one of the two or more arrays being offset in a direction of the longitudinal axis with respect to others of the at least two arrays while overlapping in longitudinal position along said longitudinal axis relative to the others of the at least two arrays such that the at least one of the two or more arrays has different end points as measured along the longitudinal axis of the device than the others of the at least two arrays;
    a microcontroller coupled to the two or more arrays of optical sensors and configured to determine a positional offset along the longitudinal axis at which a laser reference beam is detected by at least one of the two or more optical sensor arrays;
    wherein each of the optical sensors of the two or more arrays are positioned within the housing directly underneath one of the plurality of slots, each of the plurality of slots having edges that are aligned with edges of the respective array of optical sensors positioned underneath.

2. The sensing device of claim 1, wherein the two or more arrays of optical sensors together cover all positions along a span of distance along the longitudinal axis.

3. The sensing device of claim 1, further comprising at least one filter element positioned within the housing and at least partially covering the optical sensors of the two or more arrays so as to block wavelengths other than the wavelength of the laser reference beam from reaching the optical sensors.

4. The sensing device of claim 1, further comprising:
    an additional array of optical sensors arranged linearly with respect to a traverse axis perpendicular to the longitudinal axis,
    wherein the microcontroller is coupled to the additional array of optical sensors and is configured to determine a positional offset along the transverse axis at which light is detected by the additional array of optical sensors.

5. The sensing device of claim 1, wherein at least one of the two or more arrays of optical sensors is positioned at different depths beneath the plurality of the slots than others of the two or more arrays.

6. The sensing device of claim 1, wherein the two or more arrays of optical sensors include photodiodes sensitive to a specific wavelength.

7. The sensing device of claim 1, further comprising an accelerometer adapted to measure a tilt of the device with respect to a gravity vector.

8. The sensing device of claim 1, wherein the two or more arrays of optical sensors include:
    a first array of optical sensors linearly aligned along the longitudinal axis;
    a second array of optical sensors linearly aligned along the longitudinal axis adjacent to and offset along the longitudinal axis with respect to the first array; and
    a third array of optical sensors arranged linearly aligned along the longitudinal axis, the third array positioned adjacent to and offset along the longitudinal axis with respect to the second array opposite from the first array.

9. A sensing device for measuring an offset along a longitudinal axis comprising:
    a housing having a front surface;
    two or more arrays, each array including a plurality of optical sensors arranged which are linearly aligned in a direction of the longitudinal axis within the housing, at least one of the two or more arrays being offset along the longitudinal axis with respect to others of the at least two arrays while overlapping in longitudinal position along said longitudinal axis relative to the others of the at least two arrays such that the at least one of the two or more arrays has different end points as measured along the longitudinal axis of the device than the others of the at least two arrays;
    a microcontroller coupled to the two or more arrays of optical sensors and configured to determine a positional offset along the longitudinal axis at which a laser reference beam is detected by at least one of the two or more arrays of optical sensors;
    wherein each of the optical sensors of the two or more arrays are positioned within the housing underneath one of the plurality of slots, each of the plurality of slots having edges that are aligned with edges of the respective array of optical sensors positioned underneath and
    wherein one of the two ore more arrays is positioned at a different depth beneath the front surface of the housing than the other arrays.

10. The sensing device of claim 9, wherein each of the optical sensors of the two or more arrays are positioned within the housing underneath one of the plurality of slots, so as to reduce an angle of incidence of radiation received by the optical sensors of the two or more arrays.

11. The sensing device of claim 9, wherein the two or more arrays cover all positions along a span of distance along the longitudinal axis of the device.

12. The sensing device of claim 9, further comprising:
    an additional array of optical sensors arranged linearly with respect to a traverse axis perpendicular to the longitudinal axis,
    wherein the microcontroller is coupled to the additional array of optical sensors and is configured to determine a positional offset along the transverse axis at which light is detected by the additional array of optical sensors.

13. The sensing device of claim 10, wherein at least one of the two or more arrays is positioned at different depths beneath the plurality of the slots than others of the two or more arrays.

14. The sensing device of claim 9, wherein the two or more arrays of optical sensors include photodiodes sensitive to a specific wavelength.

15. The sensing device of claim 9, further comprising an accelerometer adapted to measure a tilt of the device with respect to a gravity vector.

16. The sensing device of claim 9, wherein the two or more arrays of optical sensors include:
    a first array of optical sensors linearly aligned along the longitudinal axis;

a second array of optical sensors linearly aligned along the longitudinal axis adjacent to and offset along the longitudinal axis with respect to the first array; and a third array of optical sensors arranged linearly aligned along the longitudinal axis, the third array positioned adjacent to and offset along the longitudinal axis with respect to the second array opposite from the first array.

\* \* \* \* \*